US010802856B1

(12) United States Patent
Matatyaou et al.

(10) Patent No.: US 10,802,856 B1
(45) Date of Patent: Oct. 13, 2020

(54) VIRTUAL CABLE HUB

(71) Applicant: Harmonic, Inc., San Jose, CA (US)

(72) Inventors: Asaf Matatyaou, San Carlos, CA (US); Nitin Sasi Kumar, San Ramon, CA (US)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 16/054,979

(22) Filed: Aug. 3, 2018

Related U.S. Application Data

(60) Provisional application No. 62/544,550, filed on Aug. 11, 2017.

(51) Int. Cl.
| | | |
|---|---|---|
| *G06F 9/455* | (2018.01) | |
| *H04L 12/24* | (2006.01) | |
| *H04N 21/426* | (2011.01) | |
| *H04L 12/725* | (2013.01) | |
| *H04L 12/28* | (2006.01) | |

(52) U.S. Cl.
CPC ...... *G06F 9/45541* (2013.01); *H04L 12/2801* (2013.01); *H04L 41/069* (2013.01); *H04L 45/306* (2013.01); *H04N 21/42676* (2013.01)

(58) Field of Classification Search
CPC ..... H04L 12/4633; H04L 12/46; H04L 12/28; H04L 41/06; H04B 3/46; H04N 17/00; G06F 9/455
See application file for complete search history.

(56) References Cited

U.S. PATENT DOCUMENTS

| | | | | |
|---|---|---|---|---|
| 10,020,962 | B2* | 7/2018 | Patrick | H04L 12/4641 |
| 2014/0294052 | A1* | 10/2014 | Currivan | H04L 25/0226 |
| | | | | 375/224 |
| 2014/0359389 | A1* | 12/2014 | Seastrom | H04N 21/23608 |
| | | | | 714/751 |
| 2015/0092531 | A1* | 4/2015 | Bernstein | H04L 41/0672 |
| | | | | 370/216 |

(Continued)

OTHER PUBLICATIONS

Gigi Sayfan, Mastering Kubernetes, May 2017, Packt Publishing, (Year: 2017).*

(Continued)

*Primary Examiner* — Ayaz R Sheikh
*Assistant Examiner* — Louis Samara
(74) *Attorney, Agent, or Firm* — Brokaw Patent Law PC; Christopher J. Brokaw

(57) ABSTRACT

A virtualized Cable Modem Termination System (CMTS) that provides high speed data services to one or more remote physical devices (RPDs). The CMTS comprises one or more first servers that each perform packet switching and routing as well as one or more second servers that each perform CMTS functions for the one or more remote physical devices (RPDs). Each of the one or more first servers and each of the one or more second servers are each implemented entirely on commercial off-the-shelf (COTS) hardware. Further, the CMTS functions comprise telemetry, displaying and supporting a dashboard that depicts historical events that occurred or ongoing events presently occurring at the virtualized CMTS, dynamic instantiation and deinstantiation of virtual machines in which software processes implementing the CMTS functions execute in proportion to demand at the virtual CMTS, logging, and analytics.

12 Claims, 6 Drawing Sheets

(56) References Cited

U.S. PATENT DOCUMENTS

| | | | |
|---|---|---|---|
| 2015/0095960 A1* | 4/2015 | Hurst | H04N 17/004 |
| | | | 725/107 |
| 2015/0270988 A1* | 9/2015 | Finkelstein | H04L 12/66 |
| | | | 370/401 |
| 2015/0271268 A1* | 9/2015 | Finkelstein | H04L 67/12 |
| | | | 370/400 |
| 2016/0299830 A1* | 10/2016 | Chastain | G06F 9/45558 |
| 2016/0328252 A1* | 11/2016 | Singh | G06F 9/455 |

OTHER PUBLICATIONS

"What is Kubernetes?", "https://kubernetes.io/docs/concepts/overview/what-is-kubernetes/" Aug. 1, 2017 (Year: 2017).*

* cited by examiner

| Hardware-based Challenges | Virtualization Opportunities |
| --- | --- |
| Unsustainable space, power and cooling | Dramatically reduced space, power and cooling footprint |
| Proprietary and custom hardware, with long development cycles | More frequent and shorter development cycles |
| Complex and infrequent software upgradeability results in slow feature introduction | Agile development with frequent software upgrades delivers fast feature velocity |
| Limited capacity, scalability and flexibility | Sustainable capacity growth, elastic scalability and increased flexibility |
| Larger failure domain | Smaller failure domains |
| High operational expenditure (OpEx) | Improved Total Cost of Ownership (TCO), including reduced operational (OpEx) and capital expenditure (CapEx) |

FIG. 2

| Old Way | New Way |
|---|---|
| Application runs on custom hardware | Application runs on COTS hardware |
| Application is implemented partially or fully on hardware components (e.g. ASIC, FPGA) | Application is implemented in software |
| Replaced every three to five years | Long lifespan |
| Application is upgraded infrequently | Application is upgraded regularly |
| Equipment location is limited | Equipment location is varied |
| Services turned on are labor intensive | Services are turned on automatically with orchestration |
| Service monitoring is labor intensive | Service monitoring (telemetry) is performed by software analytics |
| Service events are limited to local hardware storage | Service events are stored in the cloud |

FIG. 3

VIRTUAL CABLE HUB

CLAIM OF PRIORITY

The present application claims priority to U.S. Provisional Patent Application No. 62/544,550, entitled "Real-World Deployment of a Virtual Cable Hub," filed on Aug. 11, 2017, the disclosure of which is hereby incorporated by reference for all purposes in its entirety as if fully set forth herein.

FIELD OF THE INVENTION

Embodiments of the invention generally relate to a Cable Model Termination System (CMTS), and more particularly, to approaches for providing a virtualized CMTS.

BACKGROUND

Converged Cable Access Platform (CCAP) is a standard, proposed and administered by CableLabs of Sunnyvale, Calif., for an architecture employed by a cable operator. The motivation behind CCAP is to lower the operating costs of cable operators via a single platform which can offer traditional video and broadband services to their consumers. CCAP is a managed architecture as it leverages existing cable technologies and makes provisions for new ones that may arise. As a result, cable operators may take many different paths towards conforming to the CCAP standard, and thereafter, may continue to evolve their architecture in many different ways post-compliance to CCAP.

A Cable Modem Termination System (CMTS) refers to a piece of equipment, typically located at a cable company's headend, which is used to provide high speed data services to cable subscribers.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 2 is a table of virtualization opportunities for a Cable Hub according to an embodiment of the invention;

FIG. 3 is a table of virtualization changes in the Cable Hub according to an embodiment of the invention;

DETAILED DESCRIPTION OF THE INVENTION

Approaches for a virtualized Cable Modem Termination System (vCMTS) are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

According to the techniques discussed herein, different aspects of a cable hub will be evaluated for virtualization, including the use of cloud technologies for telemetry and monitoring, configuration and orchestration, operations and back-office elements, as well as a software-based CCAP solution based on a virtual CMTS (vCMTS) implementation. Virtualization implementation approaches will be compared, such as containerization and virtual machines (VM), for different applications and services. In addition to operationalization considerations, support for maintaining legacy service, such as traditional broadcast video, Video-on-Demand (VOD), and out-of-band (OOB), as well as existing and future IP services, will be considered in the transition to a virtual cable hub.

Embodiments may employ virtualization to enable change at a pace which meets or exceeds customer demand in the most effective manner. Change can be defined in many ways, such as new services, additional security, elastic storage, more efficient infrastructure and importantly for the cable broadband industry, enhanced speed. Embodiments may employ virtualization by separating applications or software from hardware. Key benefits for doing so are scalability, sustainability and elastic deployment with the quickness and agility needed to increase business efficiencies and productivity. This separation of software and hardware is the key to quickness and agility of change, as the software can be changed while running on deployed hardware. Upgrading software is not only quicker than replacing hardware, but requires less operational expenditure (OpEx), such as onsite labor and increase in power consumption requirements.

Figure 1:
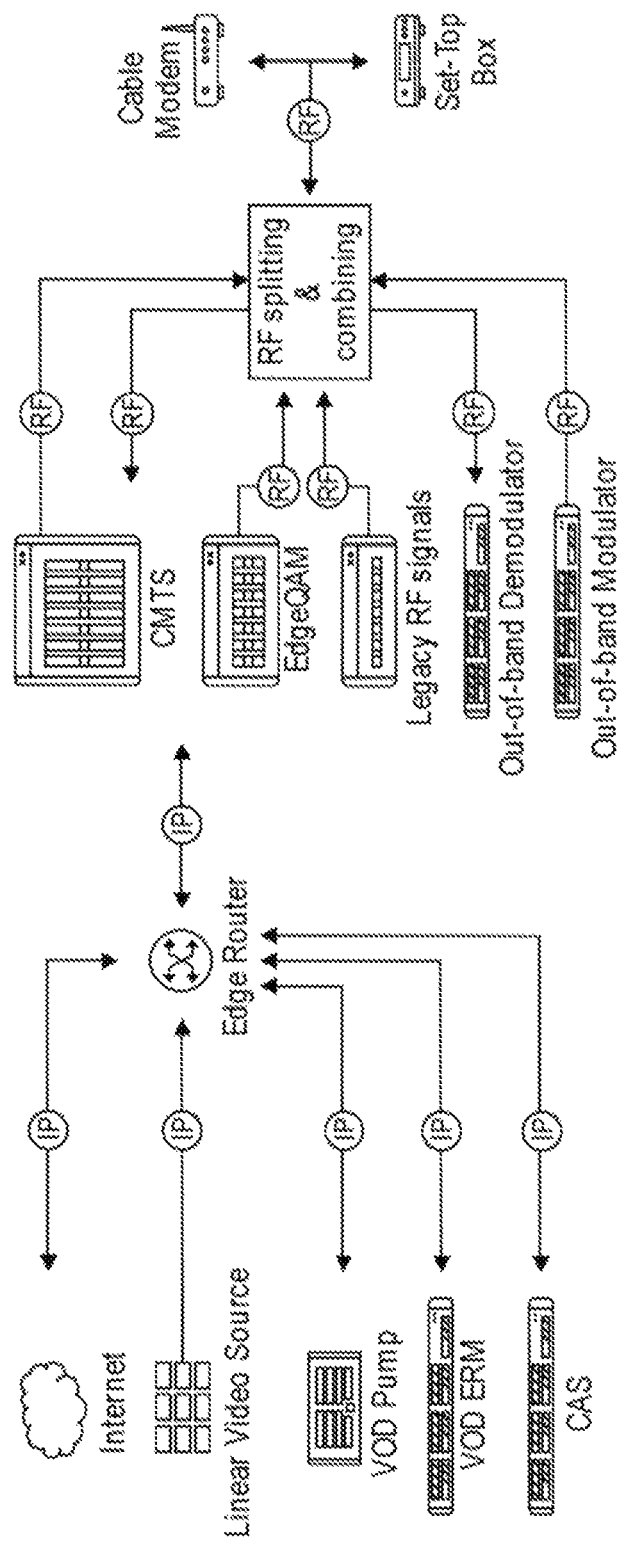
FIG. 1 is an illustration of Cable Hub in which an embodiment of the invention may be deployed.

FIG. 1 is an illustration of Cable Hub in which an embodiment of the invention may be deployed. Today's cable hub is a combination of many legacy and purpose-built hardware-based solutions, which over the past 20 years (DOCSIS turned 20 years in March 2017) has delivered on data, voice and legacy (MPEG-based) video services. To deliver these fundamental services (other services, such as home security and commercial services, are typically running over the DOCSIS data service as the fundamental service), active equipment found in a typical cable hub includes:

1. Cable Modem Termination Systems (CMTS)
2. EdgeQAMs
3. Routers and switches
4. Out-of-band modulators and return path demodulators
5. FCC and LTE leakage signal generation
6. Provisioning servers (such as DHCP and TFTP)
7. Configuration tools
8. Monitoring tools Most of the equipment listed above can be categorized as either custom hardware (e.g. CMTS & EdgeQAM) or custom software (e.g. configuration and management tools) and most are purpose-built for the cable edge (with the exception of routers, switches and some of the provisioning server components). The challenges in continuing with a customized cable edge and hardware-based approach as compared to a virtualization approach are shown in FIG. 2.

Today's cable hub is most challenged by the equipment which does not sustainably scale physically or operationally with service or capacity growth. Sustainable growth will happen when the performance and scale meets or exceeds consumer consumption demands, either driven by actual usage or competition from other access providers, such as Fiber To The Home (FTTH). In other words, virtualizing the cable hub is a high-tech solution for a low-tech problem, specifically, running out of facility space, as well as ever-increasing and recurring electricity expenses.

Another consideration for the ever-evolving cable hub is Remote PHY. While this standard technology enables virtualization in many ways, it also demands many more nodes (or service groups) being deployed, with some estimates exceeding a ten-fold increase in nodes. Today's Cable Hub deployment is manual and labor intensive and does not scale operationally, especially when considering the desired deployment rate of Remote PHY nodes. Today's cable hub tools include tried-and-true and very familiar tools such as Command Line Interface (CLI), Simple Network Management Protocol (SNMP) and Internet Protocol Detail Record (IPDR). In many cases, individual cable operators have customized home-grown tools, interfacing to hardware-based equipment over standard protocols (SNMP, IPDR) or proprietary CLI. These configuration and management interfaces are also archaic, slow and manual in many cases.

The equipment and tools which benefit the most when transitioning to a sustainable growth deployment model will be highlighted as components in the cable hub which have been virtualized in a real-world deployment of a virtual cable hub.

When looking at how virtualization applies to the cable edge space, particularly in the cable hub, equipment and tools that are custom hardware-based or benefit from orchestration (for the purpose of eliminating labor intensive human interaction to operate and manage services) will be considered. To be specific, there is a disruptive change coming to cable hubs, as described in FIG. 3.

Virtualization in a virtual cable hub involves running virtual applications (for example, DOCSIS, video, out-of-band (OOB)) on commercial-off-the-shelf (COTS) x86 platforms (hardware compatible with the x86 instruction set architecture), which can be located in cable hubs, more centrally in fewer locations (such as data centers) or even in smaller form factors in distributed locations (such as street cabinets).

In this virtual cable hub, telemetry and logging tools perform analysis of streaming data predicting potential impactful events or visualizing historical events in a holistic fashion. In many ways, the idiom "a picture is worth a thousand words" becomes reality. Instead of hours of labor intensive human scrutiny, which may result in a partial analysis and slower resolution of a field issue, a glance of dashboard provides an instantly clear picture showcasing visualized streaming data. The benefit is speed and accuracy in determining a more complete resolution.

Defining cable edge virtualization as running cable-specific virtual applications in software is a first step in the right direction. This identifies what elements or equipment will be virtualized. However, other virtualization concepts are important to consider, specifically how the software is virtualized. Other concepts to consider include containerization, virtual machines and bare metal approaches. Some of these methods are mutually exclusive, while others are complementary or even dependent on each other. For this paper, the following definitions will be used for these concepts and are based on the actual usage of virtualizing a cable hub.

Bare metal: an application is executing on the native operating system (OS), in comparison to executing on a virtual machine or a virtual OS layer. In other words, the application can access "the metal" directly or via a native OS.

Virtual machine: System virtual machines are capable of virtualizing a full set of hardware resources, including a processor (or processors), memory and storage resources and peripheral devices. A virtual machine monitor (VMM, also called hypervisor) is the piece of software that provides the abstraction of a virtual machine.

Virtual appliance: "a pre-integrated, self-contained system that is made by combining a software application (e.g., server software) with just enough operating system for it to run optimally on industry standard hardware or a virtual machine (e.g., VMWare, VirtualBox, Xen HVM, KVM)."

Containerization: "applications can be broken up into manageable, functional components, packaged individually with all of their dependencies, and deployed on irregular architecture easily."

Docker: a set of tools to package and deploy containers, which can specify container constraints and access permissions. Additionally, Docker sets up and deploys the container in Linux.

Cloud native: "cloud native computing uses . . . software . . . to be containerized, dynamically orchestrated, and microservices oriented."

Sandboxing: an isolated computing environment for running applications.

Single-tenant: a single instance of a single application type running a single physical hardware platform.

Multi-tenant: multiple instances of a one or more application types running on one or more physical hardware platforms.

Kubernetes: "an open-source system for automating deployment, scaling, and management of containerized applications."

Kubernetes-native application: an application which is aware that it's being deployed or managed by Kubernetes.

Microservice: "refers to an architectural approach that independent teams use to prioritize the continuous delivery of single-purpose services. The microservices model is the opposite of traditional monolithic software which consists of tightly integrated modules that ship infrequently and have to scale as a single unit."

The key criteria for deciding between the various virtualization approaches are:

1. Time to market (TTM): the time criticality to deliver a minimum feature set of a virtualized set of applications. Over time, the feature set will grow with periodic software upgrades to the virtual applications.
2. Performance: the minimum application processing required to deliver a cost-effective footprint of COTS x86 servers. Over time, the performance will improve with periodic software upgrades to the virtual applications and the performance per rack unit will increase or the number of rack units will diminish to deliver the same performance.
3. Scale of deployment: the minimum quantity of consumers supported by a virtual cable hub. Over time, the scale of deployment per rack unit will increase or the number of rack units will diminish to support the same quantity of consumers.
4. Application flexibility: the minimum set of application types and elasticity to execute different instances of different applications on a single physical server. Over time, the ability to execute many and different instances of different application types on a variable set of physical servers will be possible with periodic software upgrades.

The common theme for all four criteria (TTM, performance, scale, and application flexibility) is that there is a minimum or "good enough" starting point and that future software upgrades improve the virtual cable hub capabilities in different dimensions.

The most common question when discussing what and how to virtualize a cable hub is the notion that using virtual machines (VMs) is required. It's a possibility, but not a necessity. Let's compare bare metal, containerization with Docker and virtual machine approaches to a virtual cable hub, taking into account the four key virtualization criteria.

Two possible approaches include:
1. Single-tenant application running on bare metal or a virtual machine
2. Multi-tenant containerized application instances packaged and deployed by Docker on bare metal or virtual machine The most complex and performance-intensive application in a virtual cable hub is the virtual CMTS (vCMTS) component. As defined by the CableLabs Remote PHY standard, the DOCSIS physical layer is separated from all the upper layers, via the standards-based protocols Remote Downstream External PHY Interface Specification (DEPI) Remote Upstream External PHY Interface Specification (UEPI), and Generic Control Plane Specification (GCP). When referring to the vCMTS component in the context of virtualization, the CMTS Core functionality (as defined in the CableLabs Remote PHY standards) is implemented as a virtual application.

An incremental approach that may be employed by embodiments when virtualizing the cable hub is a crawl, walk, run, fly approach. With a virtualized approach rooted in software, maturing from crawling to flying is entirely performed by software upgrades along the way, and the penalty of tripping over oneself is limited to a software release iteration with no need to replace hardware.

One metric of vCMTS performance is the packet processing rate, which in turn results in the bandwidth or throughput capabilities of a vCMTS. Meeting real-world performance requirements dictates that a single-tenant vCMTS application running on bare metal has the quickest TTM, while still delivering on many virtualization benefits. Effectively, this is a virtual appliance approach, which can grow and scale accordingly by adding more servers, each running a single instance of a vCMTS virtual application. Concluding quickly on whether the simplest virtualization approach meets the performance and scale requirements to deliver on the stated benefits of virtualization while meeting or exceeding functional requirements of traditional hardware-based CMTS approaches is vital.

In practice, running a single instance of a vCMTS application on x86 COTS servers delivers tens of Gbps of packet processing performance per x86 server rack unit to dozens of service groups, while reducing the space, power and cooling footprint by up to 90% relative to existing hardware-based integrated CMTSs.

The result of this first phase of a virtual cable hub is already delivering substantial capital and operating expenditure benefits to cable operators, and can be debated whether the benefits already justify stating that this approach is "running."

Continuing with the crawl, walk, run, fly analogy, let's shift gears and see how fast a virtual cable hub can fly. The next set of critical benefits to a cable operator when looking at a cable hub are still covered by the four criteria (TTM, performance, scale and application flexibility):
1. TTM: the speed to turn on consumer services to a single set of consumers
2. Performance: improving uptime by limiting the scope of service outages
3. Scale: the quantity of consumers which can be supported in a given footprint
4. Application flexibility: the set of virtual applications which are required for a virtual cable hub The approach of multi-tenant containerized application instances packaged and deployed by Docker on bare metal provides many of these benefits. Let's identify which virtualization concept delivers on these benefits.

Kubernetes provides the orchestration to deploy pods (a group of one or more containers), in conjunction with Docker as the tool to package the pods. "A pod models an application-specific 'logical host'—it contains one or more application containers which are relatively tightly coupled—in a pre-container world, they would have executed on the same physical or virtual machine. While Kubernetes supports more container runtimes than just Docker, Docker is the most commonly known runtime, and it helps to describe pods in Docker terms. Pods serve as unit of deployment, horizontal scaling, and replication."

The speed to turn on consumer services is increased significantly when using a combination of Kubernetes and a Docker approach to pods deployment. This speed increase is gained when shifting from a human interaction to configure manually each unit of consumer deployment to an orchestrated and automated process. Additionally, reliability increases as the more error-prone manual method of configuring new consumer services is reduced or eliminated.

Improving uptime is a function of reducing failure domain size, which is a major benefit of a containerized approach. Determining the failure domain size of each pod or container provides the knob when determining the tradeoff between potentially more shared resources in a single pod (increasing CPU utilization percentage) and limiting the pod to a single consumer group, such as a service group. Software failures will happen and uptime is improved as failure domains are reduced. By any measure, the performance metrics of uptime percentage and the number of service calls received over a period of time is tracked by cable operators.

Containerization also has the benefit of horizontal scaling (scale-out) in comparison to vertical scaling (scale-up). Vertical scaling increases a single application instance's set of specifications, such as bandwidth or subscriber count, by increasing the number of x86 CPU cores, storage or NIC speed. A virtual cable hub uses vertical scaling to grow capacity when a single application instance can do more. Horizontal scaling increases a virtual cable hub's scale with a virtual set of application instances (pods), each with a specific and purposefully bounded scale specification. When the limitation of a single pod is reached, more pods are deployed.

Figures 4, 5:
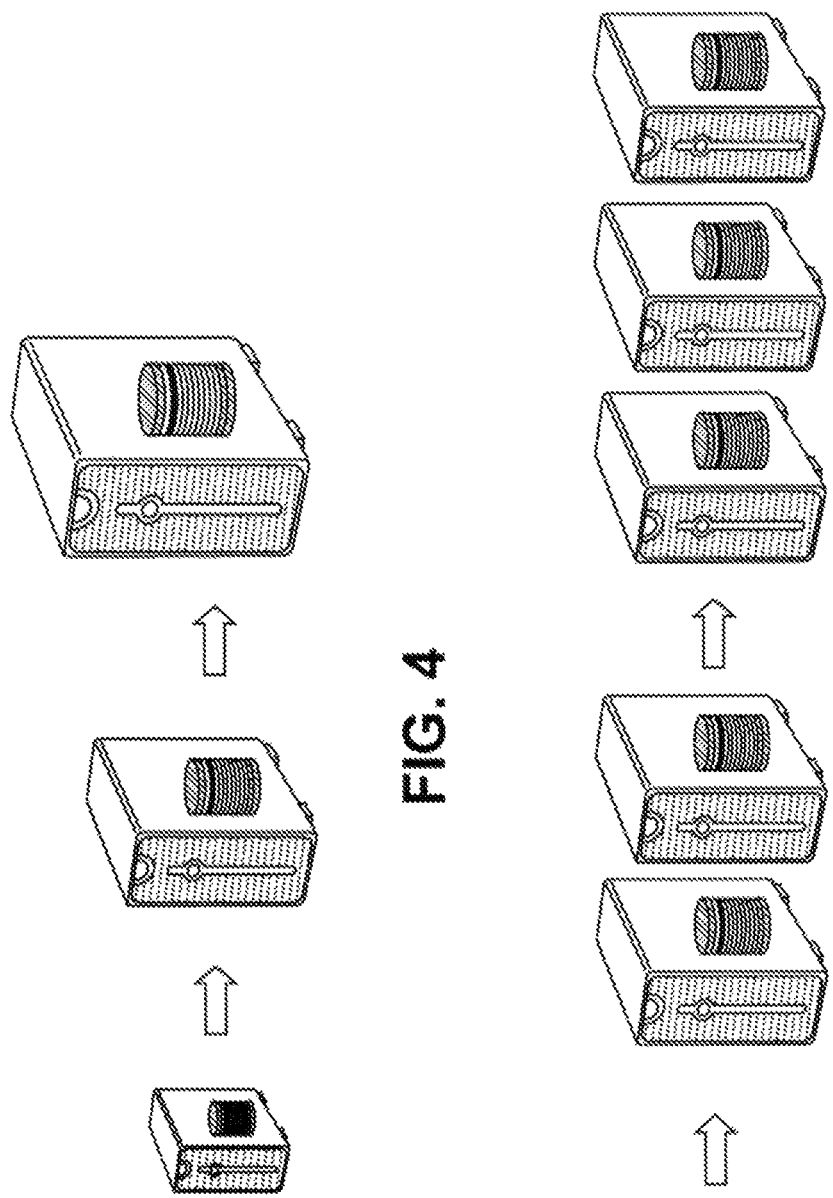
FIG. 4 is an illustration of vertical scaling according to an embodiment of the invention.
FIG. 5 is an illustration of horizontal scaling according to an embodiment of the invention.

FIG. 4 is an illustration of vertical scaling according to an embodiment of the invention, and FIG. 5 is an illustration of horizontal scaling according to an embodiment of the invention. The benefits of horizontal scaling through containerization are: smaller failure domain, simpler to develop, simpler to test and more cost-effective COTS x86 server hardware requirements. Development and testing simplicity is explained when considering smaller data sets and test case parameters, such as developing to and testing to a scale of 200 as compared to 200,000 subscribers.

Lastly, multi-tenant in the context of a virtual cable hub, is having multiple instances of a single or multiple application types. Each pod of containers may be a different application type, and potential applications include CMTS Core, Out-of-band Core, Video Core, proactive network maintenance (PNM), orchestration and telemetry. Over time, different and new applications will be considered for virtualization. The benefit is leveraging the same COTS x86 servers for different application types, which delivers improved sparing (for hardware failures and replacement) and economy of scale benefits when procuring many of the same platform. When different applications are able to execute on the same COTS x86 server, dynamic and elastic utilization of CPU resources can be determined, during run-time, based on usage metrics and analytics to shift resources from lightly loaded applications to applications running hot.

The combination of the approaches described and benefits can be also referred to as microservices, which was previously defined as a "continuous delivery of single-purpose services." Shifting from hardware-based to software-based implementations, as well as shifting in software development methodology from waterfall to agile, results in dramatically improved feature velocity. Shifting from traditional monolithic software to a microservices approach is another lever which improves feature velocity and delivers more frequent and higher quality software upgrades.

Monolithic software is released as a single unit, and due to size and complexity, has more software defects as well as longer regression test cycle time. Microservices are lighter-weight modular units of software, which can be defined with a limited set of capabilities with published interfaces. With monolithic software, it's all or nothing. With microservices, each upgraded service software can be tested with lighter-weight automation and shorter regression test cycle time.

A notable benefit is improved software upgradeability, in terms of total time and service outage potential. Microservices, by definition, have smaller code size than a single monolithic software image. This results in less time to download software images, less time to upgrade software to a limited set of one or more microservices and reducing the minimal amount of code changes when correcting defective software. When performing hitless or in-service-software-upgrades (ISSU), redundancy or protection mechanisms are typically employed to activate a protected unit of software while the originally active software unit is upgraded without impacting service. However, during this time, overall system protection is diminished. With microservices, the total amount of unprotected time during ISSU is reduced, improving overall high-availability of the virtual cable hub.

Figure 6:
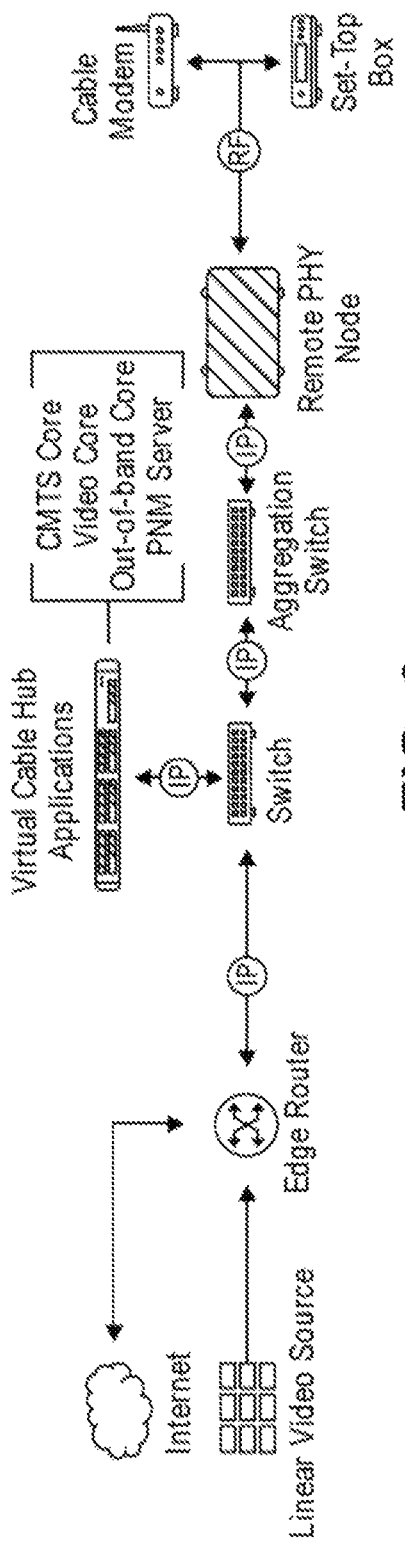
FIG. 6 is an illustration of a virtual cable hub according to an embodiment of the invention.

The CMTS and EdgeQAM, which are historically implemented in big-iron hardware-based chassis, as well as legacy RF signal and out-of-band signal generation performed in the cable hub are shown as example applications which are virtualized as multi-tenant containerized applications turned on with automated orchestration on COTS x86 servers (as shown in FIG. 6). In this future vision of a virtual cable hub, all data, video and voice services for residential and business customers are IP-based.

The virtual cable hub depicted in FIG. 6 is a bit too idealistic as a starting point, with the noted legacy services of linear/broadcast MPEG video, video-on-demand (VOD), switched digital video (SDV), as well as out-of-band signaling for set-top box (STB) and legacy RF signal generation such as FM. With millions of legacy consumer devices at subscribers' homes, these legacy services will be reduced over many years, eventually being replaced by pure IP-based services. Until that moment, the virtual cable hub, deployed in a distributed access architecture (DAA) such as Remote PHY, will need to support IP transport of the RF signals at the virtual cable hub, with the IP transport converted and modulated to RF signals at the Remote PHY node.

Figure 7:
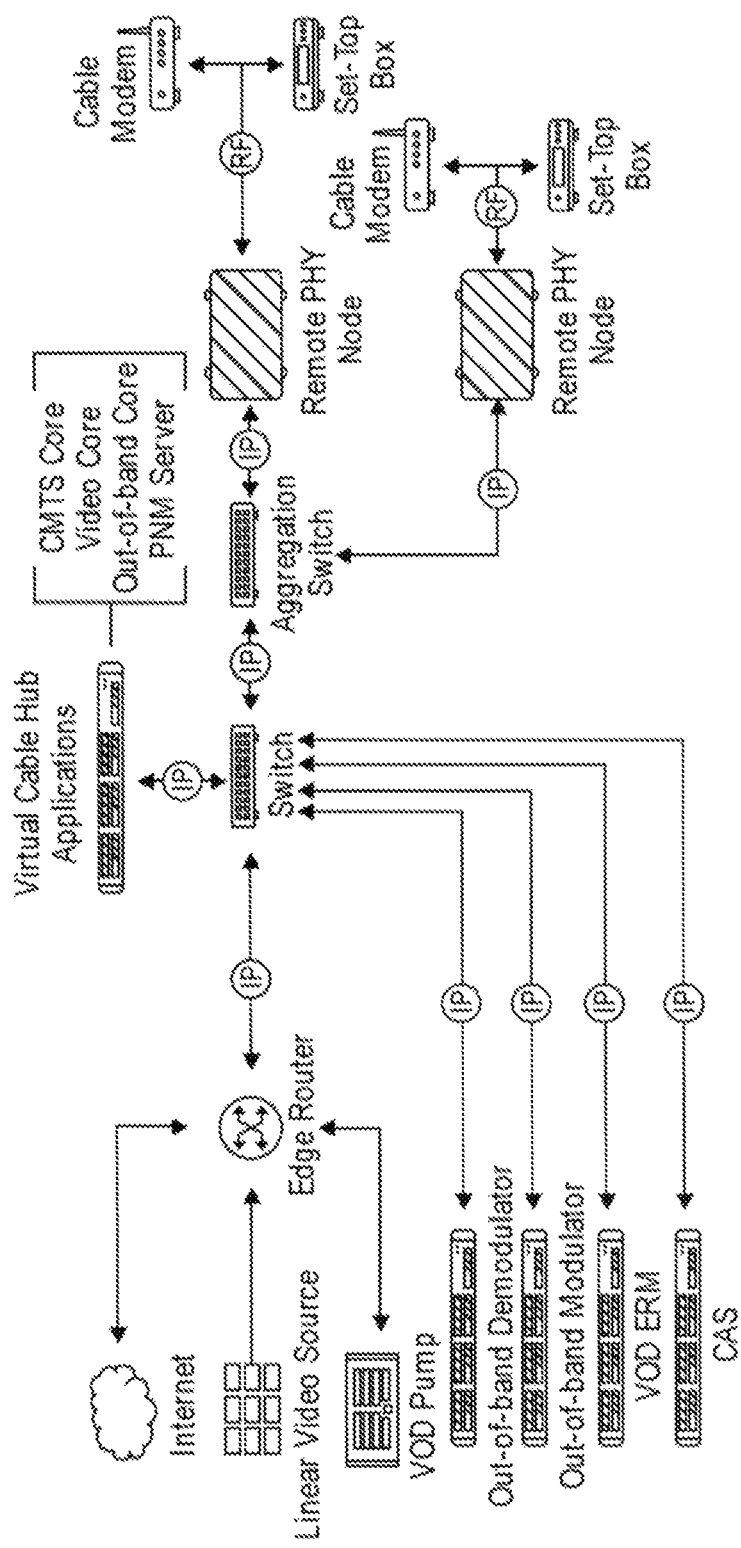
FIG. 7 is an illustration of a virtual cable hub in conjunction with legacy services according to an embodiment of the invention.

The applications to encapsulate the IP transport of the legacy RF signals don't require much processing and are scalable. With a virtual cable hub, instead of requiring single-purpose custom hardware-based solutions for each and every specialized legacy function, a virtual application can be deployed on available server resources in a cluster of servers to deliver the necessary capabilities. FIG. 7 shows a virtual cable hub with legacy services supported.

The virtual cable hub described in this paper can be considered to be "cloud native" as it meets the conditions defined: containerized, dynamically orchestrated and microservices oriented. However, "cloud native" can also refer to applications executing in the cloud (private/on-premises or public). An example of a public cloud service is Amazon Web Services (AWS), which claims "on-demand delivery of compute power, database storage, applications, and other IT resources through a cloud services platform."

The virtual cable hub is advancing quickly in real-world deployments and delivering a full set of services, meeting demanding performance requirements for speed, latency and jitter. With vital residential and commercial services being delivered, it's important to intelligently weigh the tradeoffs if services might be hindered in a measurable way. Even in the early days of a virtual cable hub, some configuration and monitoring may be serviced in the cloud, public or private. In particular, logging and monitoring is well suited for the cloud, with on-demand increase in database storage and easy accessibility to telemetry and analytics.

Consider the limitations of a traditional hardware-based solution, with finite on-board storage for a small service area. Once the storage is exhausted, the older data is replaced with fresh data, which leads to less samples of data being stored or a short time span of data analytics or logging. Additionally, correlating data is a labor-intensive activity, with a person logging into each platform remotely. In a virtual cable hub, a continuous stream of data is sent to the cloud, with machine analytics performed on a much larger service area. The cloud service expands, as necessary, to support longer time spans. Moreover, instead of data taken at a few instants in time, the data is nearly continuous and provides a complete picture of the virtual cable hub health.

As was predicted over the past few years, virtualization has arrived in the cable edge. The virtual cable hub will leverage the numerous and substantial virtualization benefits from other industries and apply these tried-and-true virtualization concepts for the first time. These concepts are the keys to unlocking the path to sustainably growing capacity, adapting quickly to customer demands, and a solution which is flexible and elastic enough to dynamically augment and shift resources to the most in-demand applications.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer readable storage mediums storing one or more sequences of instructions for a virtualized Cable Modem Termination System (CMTS), which when executed by one or more processors, cause:
   said virtualized Cable Modem Termination System (CMTS) providing high speed data services to one or more remote physical devices (RPDs), wherein said virtualized Cable Modem Termination System (CMTS) comprises:
      one or more first servers that each perform packet switching and routing; and
      one or more second servers that each perform CMTS functions for said one or more remote physical devices (RPDs),
      wherein each of said one or more first servers and each of said one or more second servers are each implemented entirely within an application-specific logical host composed of one or more application containers,
      wherein each of the application-specific logical hosts implementing one of said first or second servers possesses a failure domain limited to a single consumer group of said high speed data services,
      and wherein said CMTS functions comprise telemetry, displaying and supporting a dashboard that depicts historical events that occurred or ongoing events presently occurring at the virtualized CMTS, dynamic instantiation and deinstantiation of virtual machines in which software processes implementing said CMTS functions execute in proportion to demand at the virtual CMTS, logging, and analytics.

2. The one or more non-transitory computer readable storage mediums of claim 1, wherein said CMTS functions comprise a single-tenant application executing on bare metal or within a virtual machine.

3. The one or more non-transitory computer readable storage mediums of claim 1, wherein said CMTS functions comprise a multi-tenant application executing on bare metal or within a virtual machine.

4. The one or more non-transitory computer readable storage mediums of claim 1, wherein said virtualized Cable Modem Termination System (CMTS) further comprises a proactive network maintenance (PNM) server.

5. A system for a virtualized Cable Modem Termination System (CMTS), comprising:
   one or more processors; and
   one or more non-transitory computer-readable storage mediums storing one or more sequences of instructions, which when executed, cause:
      said virtualized Cable Modem Termination System (CMTS) providing high speed data services to one or more remote physical devices (RPDs), wherein said virtualized Cable Modem Termination System (CMTS) comprises:
         one or more first servers that each perform packet switching and routing; and
         one or more second servers that each perform CMTS functions for said one or more remote physical devices (RPDs),
         wherein each of said one or more first servers and each of said one or more second servers are each implemented entirely within an application-specific logical host composed of one or more application containers,
         wherein each of the application-specific logical hosts implementing one of said first or second servers possesses a failure domain limited to a single consumer group of said high speed data services,
         and wherein said CMTS functions comprise telemetry, displaying and supporting a dashboard that depicts historical events that occurred or ongoing events presently occurring at the virtualized CMTS, dynamic instantiation and deinstantiation of virtual machines in which software processes implementing said CMTS functions execute in proportion to demand at the virtual CMTS, logging, and analytics.

6. The system of claim 5, wherein said CMTS functions comprise a single-tenant application executing on bare metal or within a virtual machine.

7. The system of claim 5, wherein said CMTS functions comprise a multi-tenant application executing on bare metal or within a virtual machine.

8. The system of claim 5, wherein said virtualized Cable Modem Termination System (CMTS) further comprises a proactive network maintenance (PNM) server.

9. A method for a virtualized Cable Modem Termination System (CMTS), comprising:
   said virtualized Cable Modem Termination System (CMTS) providing high speed data services to one or more remote physical devices (RPDs), wherein said virtualized Cable Modem Termination System (CMTS) comprises:
      one or more first servers that each perform packet switching and routing; and
      one or more second servers that each perform CMTS functions for said one or more remote physical devices (RPDs),
      wherein each of said one or more first servers and each of said one or more second servers are each implemented entirely within an application-specific logical host composed of one or more application containers,
      wherein each of the application-specific logical hosts implementing one of said first or second servers possesses a failure domain limited to a single consumer group of said high speed data services,
      and wherein said CMTS functions comprise telemetry, displaying and supporting a dashboard that depicts historical events that occurred or ongoing events presently occurring at the virtualized CMTS, dynamic instantiation and deinstantiation of virtual machines in which software processes implementing said CMTS functions execute in proportion to demand at the virtual CMTS, logging, and analytics.

10. The method of claim 9, wherein said CMTS functions comprise a single-tenant application executing on bare metal or within a virtual machine.

11. The method of claim 9, wherein said CMTS functions comprise a multi-tenant application executing on bare metal or within a virtual machine.

12. The method of claim 9, wherein said virtualized Cable Modem Termination System (CMTS) further comprises a proactive network maintenance (PNM) server.

* * * * *